United States Patent
Kumar et al.

(10) Patent No.: US 11,403,335 B2
(45) Date of Patent: Aug. 2, 2022

(54) LEVERAGE INTERACTION ATTRIBUTES AND FILE ACCESS PATTERNS TO PREDICT ACTIVE LIFE OF MEDIA FILE TO OPTIMIZE STORAGE USAGE

(71) Applicant: inContact INC., Sandy, UT (US)

(72) Inventors: Sharma Harshit Kumar, Maharashtra (IN); Yenpure Abhijit Prakash, Maharashtra (IN); Karthik Narayanan Srinivasan, Sandy, UT (US)

(73) Assignee: INCONTACT INC., Sandy, UT (US)

( * ) Notice: Subject to any disclaimer, the term of this patent is extended or adjusted under 35 U.S.C. 154(b) by 102 days.

(21) Appl. No.: 17/060,303

(22) Filed: Oct. 1, 2020

(65) Prior Publication Data
US 2022/0107974 A1  Apr. 7, 2022

(51) Int. Cl.
*G06F 16/41* (2019.01)
*G06N 20/00* (2019.01)

(52) U.S. Cl.
CPC .............. *G06F 16/41* (2019.01); *G06N 20/00* (2019.01)

(58) Field of Classification Search
CPC ....... G06F 16/41; G06F 16/113; G06F 16/185
See application file for complete search history.

(56) References Cited

U.S. PATENT DOCUMENTS

| | | | |
|---|---|---|---|
| 11,232,064 B2 * | 1/2022 | Lacy | G06N 20/00 |
| 2009/0132543 A1 * | 5/2009 | Chatley | H04L 67/1012 |
| 2009/0132621 A1 * | 5/2009 | Jensen | G06F 3/0673 |
| 2014/0074832 A1 * | 3/2014 | Chitiveli | G06F 3/0649 707/736 |
| 2018/0373722 A1 * | 12/2018 | Ulasen | G06N 3/0445 |
| 2020/0028965 A1 * | 1/2020 | Williams | G06F 16/61 |

* cited by examiner

*Primary Examiner* — Grace Park
(74) *Attorney, Agent, or Firm* — Soroker Agmon Nordman (57) ABSTRACT

A computerized-method for determining a storage class of a media file is provided herein. The computerized-method includes: (i) aggregating data from the plurality of data sources; (ii) operating a pre-built machine learning File Access Frequency Score (FAFS) model to calculate an accessibility score for a media file; (iii) sending the media file to archive storage when the accessibility score is below a preconfigured threshold; (iv) calculating Predicted Active Lifetime Span (PALS) score of the media file, when the accessibility score is above the preconfigured threshold; (v) repeating the calculating of the PALS score of the media file every preconfigured period of time, when the media file is in active storage, until the calculated PALS score of the media file is lower than or equals zero; and (vi) sending the media file to the archive storage.

10 Claims, 4 Drawing Sheets

300A

| Current date (To depict PALS as the date changes) | Actual file access frequency in Active storage | Date when the file was last accessed (Creation date if the file was not accessed) | Time elapsed since the file was last accessed | PALS ($\theta_0 + \theta_1$ * (FAFS) + $\theta_2$ * (Actual file access frequency in Active storage) − $\theta_3$ (Time elapsed when the file was last accessed) |
|---|---|---|---|---|
| 1-Aug-20 | 0 | 1-Aug-20 | 0 | 4 |
| 2-Aug-20 | 0 | 1-Aug-20 | 1 | 3 |
| 3-Aug-20 | 0 | 1-Aug-20 | 2 | 2 |
| 4-Aug-20 | 0 | 1-Aug-20 | 3 | 1 |
| 5-Aug-20 | 0 | 1-Aug-20 | 4 | 0 |

| Current date (To depict PALS as the date changes) | Actual file access frequency in Active storage | Date when the file was last accessed (Creation date if the file was not accessed) | Time elapsed since the file was last accessed | PALS $(\theta_0 + \theta_1 * (FAFS) + \theta_2 * $ (Actual file access frequency in Active storage) $- \theta_3$ (Time elapsed when the file was last accessed) |
|---|---|---|---|---|
| 1-Aug-20 | 0 | 1-Aug-20 | 0 | 4 |
| 2-Aug-20 | 0 | 1-Aug-20 | 1 | 3 |
| 3-Aug-20 | 0 | 1-Aug-20 | 2 | 2 |
| 4-Aug-20 | 0 | 1-Aug-20 | 3 | 1 |
| 5-Aug-20 | 0 | 1-Aug-20 | 4 | 0 |

Figure 3A

| Current date (To depict PALS as the date changes) 310 | Actual file access frequency in Active storage 320 | Date when the file was last accessed (Creation date if the file was not accessed) 330 | Time elapsed since the file was last accessed 340 | PALS $(\theta_0 + \theta_1 * (FAFS) + \theta_2 * $ (Actual file access frequency in Active storage) $- \theta_3$ (Time elapsed when the file was last accessed) 350 |
|---|---|---|---|---|
| 1-Aug-20 | 0 | 1-Aug-20 | 0 | 5 |
| 2-Aug-20 | 1 | 2-Aug-20 | 0 | 5 |
| 3-Aug-20 | 1 | 2-Aug-20 | 1 | 4 |
| 4-Aug-20 | 1 | 2-Aug-20 | 2 | 3 |
| 5-Aug-20 | 2 | 5-Aug-20 | 0 | 5 |
| 6-Aug-20 | 2 | 5-Aug-20 | 1 | 4 |
| 7-Aug-20 | 2 | 5-Aug-20 | 2 | 3 |
| 8-Aug-20 | 2 | 5-Aug-20 | 3 | 2 |
| 9-Aug-20 | 2 | 5-Aug-20 | 4 | 1 |
| 10-Aug-20 | 2 | 5-Aug-20 | 5 | 0 |

LEVERAGE INTERACTION ATTRIBUTES AND FILE ACCESS PATTERNS TO PREDICT ACTIVE LIFE OF MEDIA FILE TO OPTIMIZE STORAGE USAGE

TECHNICAL FIELD

The present disclosure relates to the field of machine learning models and more specifically to machine learning models that calculate a File Access Frequency Score (FAFS) to determine storage services based on a storage class of a media file.

BACKGROUND

Current systems in contact centers monitor all agents' interactions and retain the agents' interactions recordings for regulatory purposes, quality management, dispute resolutions and the like. The media files, e.g., agents' interactions recordings, are commonly retained in a data storage of the contact center, which takes a toll on available storage space, as more and more media files are being accumulated. However, the industry average of agents' interactions recordings, which are being accessed to, may be merely approximately 10% of the recordings, which means that the rest 90% of the agents' interactions recordings, could have been archived and thus save storage space.

Currently, the systems of contact centers are using Time To Live (TTL) mechanism for each media file, based on preconfigured policies, to manage their storage resources, e.g., retention of the agents' interactions recordings. However, the TTL mechanism, which does not differentiate between media files by their level of accessibility, may suffer from several challenges. First, the TTL mechanism may be based on inefficient TTL policies and thus incur additional expenses. Second, wrong storage classification of agents' interactions recordings, such as classification as 'long-term', may result in unnecessary retrievals from long-term storage, i.e., archival storage, in cases the media file should have been stored in active data storage. Third, the maintenance of TTL policies, i.e., rule based TTL, may impose an overhead, and fourth, the refining of TTL policies for the systems of the contact center may impose an overhead for both the contact center administrators and the customer's administrator that maintain the generated media files.

Accordingly, there is a need for a technical solution that will replace the TTL mechanism and will be more efficient and will more accurately determine the storage class of each media file, e.g., agents' interactions recording, as active or long-term, for storage services purposes.

SUMMARY

There is thus provided, in accordance with some embodiments of the present disclosure, a computerized-method for determining a storage class of a media file.

In accordance with some embodiments of the present disclosure, in a computerized system comprising a processor, one or more databases of a plurality of data sources, and a memory to store the one or more databases.

Furthermore, in accordance with some embodiments of the present disclosure, the processor may be configured to: (i) aggregate data from the plurality of data sources; (ii) operate a pre-built machine learning File Access Frequency Score (FAFS) model based on the aggregated data to calculate an accessibility score for a media file; (iii) send the media file to archive storage when the accessibility score is below a preconfigured threshold; and (iv) calculate Predicted Active Lifetime Span (PALS) score of the media file, when the accessibility score is above the preconfigured threshold.

Furthermore, in accordance with some embodiments of the present disclosure, the pre-built machine learning FAFS model, may be periodically retrained with media file usage data to allow it to update any changes in the media file usage patterns and to improve the predictions i.e., calculations of accessibility score.

Furthermore, in accordance with some embodiments of the present disclosure, the processor may be further configured to repeatedly calculate the PALS score of the media file every preconfigured period of time, when the media file is in active storage, until the calculated PALS score of the media file is lower than or equals zero; and then send the media file to the archive storage. The media file may be a recording of an interaction and the aggregated data may be related to the interaction and to a customer and an agent participating in the interaction.

Furthermore, in accordance with some embodiments of the present disclosure, the storage class has related accessibility level and related cost, and wherein the storage class is selected from at least one of: archive storage and active storage.

Furthermore, in accordance with some embodiments of the present disclosure, the pre-built machine learning FAFS model may be created by: (i) collecting data from data sources, wherein the data is retrieved from related historical data databases, and wherein labeling of the data is performed according to a first access to the media file by a user; (ii) preprocessing the collected data; (iii) training the machine learning FAFS model; and (iv) performing model evaluation and algorithm selection.

Furthermore, in accordance with some embodiments of the present disclosure, the PALS score is calculated by a weighted sum of: (i) a preconfigured constant; (ii) FAFS score; (iii) a number of file access frequency in active storage; and (iv) time elapsed since the media file has been last accessed.

Furthermore, in accordance with some embodiments of the present disclosure, the preconfigured constant is determined according to a time period that a media file is required to be accessible.

Furthermore, in accordance with some embodiments of the present disclosure, the weights are determined according to a time period that a media file is required to be accessible.

Furthermore, in accordance with some embodiments of the present disclosure, the data sources are selected from at least one of: recording applications, omnichannel interaction recording, email channel, chat channel, storage services, analytics application, and quality management module.

Furthermore, in accordance with some embodiments of the present disclosure, the aggregated data from the data sources that is related to customers is selected from at least one of: customer feedback received for the interaction, customer sentiment score on the interaction, pattern of customer feedback, and an average feedback rating provided by customers in a given interaction context.

Furthermore, in accordance with some embodiments of the present disclosure, the aggregated data from the data sources that is related to agents is selected from at least one of: an agent historical performance for skill used in the interaction, a skill used to route a contact to available agents according to customer's needs and agent feedback about the customer and a team the agent belongs to.

Furthermore, in accordance with some embodiments of the present disclosure, the aggregated data from the data sources that is related to interactions is selected from at least one of: duration of the interaction as compared to Service Level Agreement (SLA), type of file, a campaign under which an interaction has been taken, and an average active storage time span of files received in similar context across customers in same domain.

Furthermore, in accordance with some embodiments of the present disclosure, computerized-method for determining a storage class of a media file may be implemented in any contact center and specifically in a contact center as a service (CCaaS) and thus leverage the recorded interaction attributes and file access patterns to predict active life of a media file to optimize storage usage.

Furthermore, in accordance with some embodiments of the present disclosure, the computerized-method for determining a storage class of a media file may be implemented in a system having a plurality of storage services, where each one of the plurality of storage services may be based on a different level of accessibility.

BRIEF DESCRIPTION OF THE DRAWINGS

In order for the present disclosure, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "accessibility" refers to the number of times in a specified period of time that a file is retrieved from a data storage.

The terms "client" and "customer" as used herein are interchangeable.

In a contact center, it is important to retain agent's contact recordings for running analytics regulatory purposes, quality management, and dispute resolutions, etc. Based on industry average approximately merely 10% of the recordings are being accessed, which means that 90% of the media files could have been archived.

The term "BUD" as used herein refers to a business unit id. It is a unique identifier for a tenant in a Contact center as a Service (CCaaS) application.

Current solutions, for management and retention of storage of the media files, use Time To Live (TTL) mechanism based on preconfigured policies. However, the TTL mechanism, which is based on preconfigured policies, bears some disadvantages, such as, inefficient TTL policies which may result in redundant expenses, wrong storage classification of the media files, which may result in excess retrievals from long-term storage, overhead of maintaining rule-based TTL mechanism, and overhead for the vendors of the contact center because, TTL policies have to be refined according to the current policies of each contact center.

Therefore, there is a need for a computerized-method to determine a storage class of a media file that will free up contact centers from defining and maintaining complex TTL policies and will reduce the support required from a contact center vendor for refining the TTL policies.

Moreover, the needed computerized-method for determining a storage class of each media file will save cost of active storage for the contact centers without compromising the operational efficiency. Thus, the storage class of each media file will be evaluated differently and only the files with the probability to be accessed in the near future will be available in active storage for frequent and quick access, whereas other files will be moved to archive, i.e., long-term storage.

Figure 1:
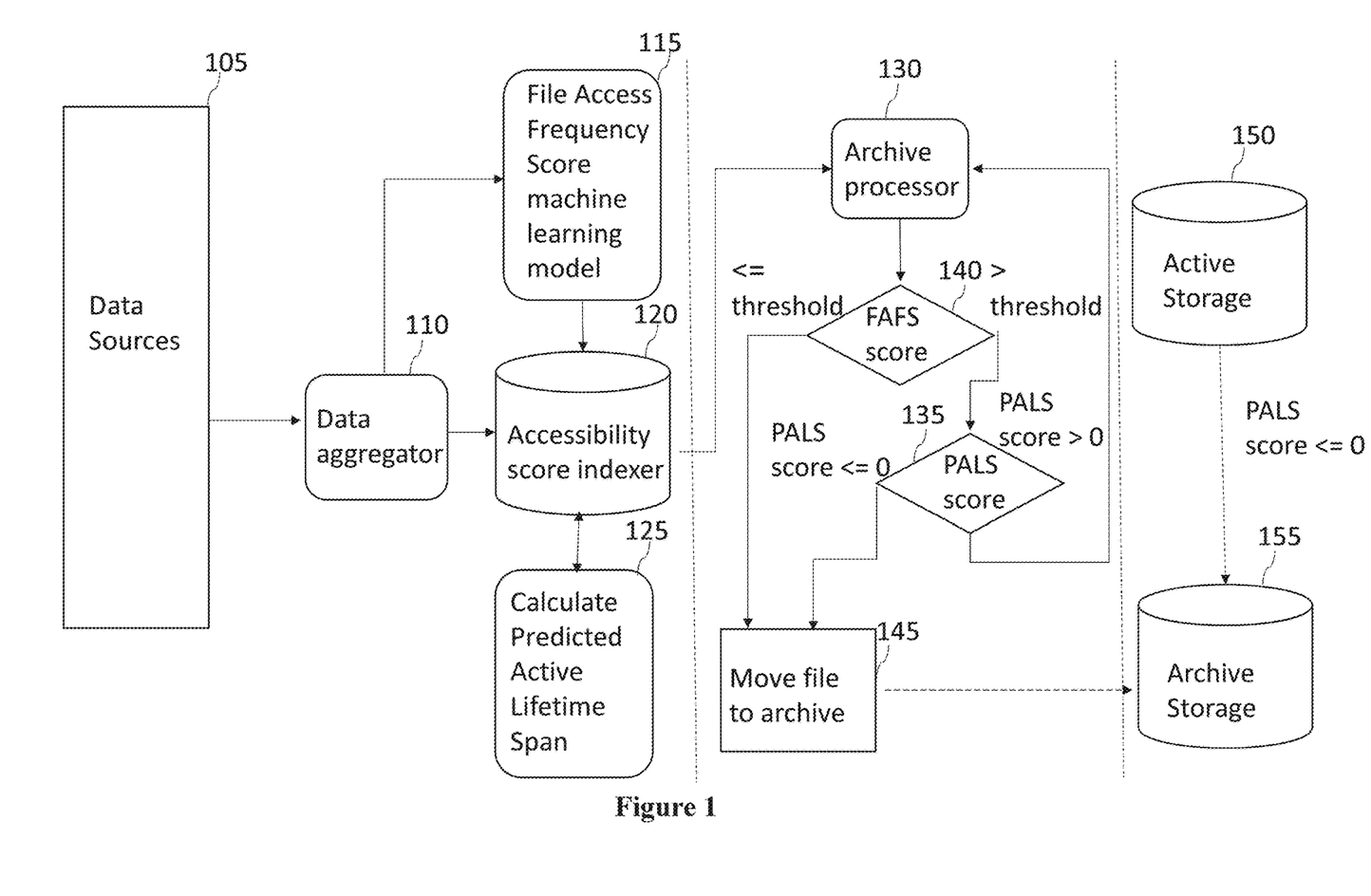
FIG. 1 schematically illustrates a high-level diagram of a computerized-method for determining a storage class of a media file, in accordance with some embodiments of the present disclosure.

FIG. 1 schematically illustrates a high-level diagram of a computerized-method for determining a storage class of a media file, in accordance with some embodiments of the present disclosure.

According to some embodiments of the present disclosure, in a contact center, every interaction between a customer and an agent is recorded and saved as a media file in a data storage. Later on, some of the media files are retrieved, according to business determined filters, for evaluation and analysis of agents' performance and therefore should be kept in the data storage, i.e., active storage.

However, media files which are not accessed when they are in active storage, may be archived, thus, saving the expense on active storage. Files which are stored in the archive storage, such as hard disk drives, solid state drives and tape drives, have to be first brought to the active storage. Hence, it requires more time and computing resources to consume files which are stored in archive storage. The cost of an archive storage is about one third than the cost of active storage and hence, a customer having a system that generates files, may have cost savings. Accordingly, each storage class (e.g., active storage and archive storage) has related accessibility level and related cost. It is desirable to find a balance between a file accessibility level and cost by storing files either in active storage or archive storage.

According to some embodiments of the present disclosure, recorded interaction attributes and file access patterns may be leveraged to predict active life of a media file, i.e., the time that the file should be stored in active storage, to optimize storage usage of a contact center. The media file may be agent's recordings of an interaction between an agent and a customer.

According to some embodiments of the present disclosure, for each generated media file, data aggregator component 110 may aggregate data from a plurality of data sources 105 and may forward it to a pre-built machine learning File Access Frequency Score (FAFS) model, such as FAFS model 115. FAFS model 115 may operate, based on the aggregated data, to calculate an accessibility score for the media file. The aggregated data from a plurality of data sources 105 may be related to the interaction and to a customer and an agent participating in the interaction.

According to some embodiments of the present disclosure, the plurality of data sources 105 may be recording applications, omnichannel interaction recording, email channel, chat channel, storage services, analytics application, and quality management module.

According to some embodiments of the present disclosure, the aggregated data from the data sources 105 may be related to customers and may be selected from at least one of: customer feedback received for the interaction, customer sentiment score on the interaction, pattern of customer feedback, and an average feedback rating provided by customers in a given interaction context.

According to some embodiments of the present disclosure, the aggregated data from the data sources 105 may be related to agents and may be selected from at least one of: an agent historical performance for skill used in the interaction, a skill used to route a contact to available agents according to customer's needs and agent feedback about the customer and a team the agent belongs to.

According to some embodiments of the present disclosure, the aggregated data from the data sources may be related to interactions and may be selected from at least one of: duration of the interaction as compared to Service Level Agreement (SLA), type of file, a campaign under which an interaction has been taken, and an average active storage time span of files received in similar context across customers in same domain.

According to some embodiments of the present disclosure, since data related to the interaction, the agent and the customer resides in various applications, hence the data aggregator component 110 may collect data from these applications asynchronously. The data aggregator component 110 may continuously forward metadata of the interaction, the agent and the customer to a data storage, such as accessibility score indexer data storage 120.

According to some embodiments of the present disclosure, the accessibility score which has been calculated by FAFS model 115, may be stored in a data storage, such as accessibility score indexer 120. For each generated media file, when the accessibility score may be above the preconfigured threshold, a Predicted Active Lifetime Span (PALS) score of the media file, may be calculated 125 and may be stored in the accessibility score indexer 120. When the accessibility score, may be below or equal to the preconfigured threshold, then the PALS score may be determined as equal zero and may be stored in the accessibility score indexer 120.

According to some embodiments of the present disclosure, the calculated accessibility score and the PALS score may be sent to an archive processor component 130. When the calculated accessibility score, e.g., FAFS score 140, may be below or equal a preconfigured threshold, the archive processor component 130 may send the media file 145 to an archive storage 155.

According to some embodiments of the present disclosure, the calculated PALS score may be compared to a preconfigured threshold 135 and when the PALS score may be above the preconfigured threshold, the media file may be kept in active storage, until the archive processor 130, after repeatedly calculating the PALS score of the media file, every preconfigured period of time, may calculate a PALS score of the media file that is lower than or equals zero.

According to some embodiments of the present disclosure, when the calculated PALS score of the media file is lower than or equals zero, the media file may be moved from active storage 150 to archive storage 155.

According to some embodiments of the present disclosure, the pre-built machine learning FAFS model may be created by (i) collecting data from data sources, wherein the data is retrieved from related historical data databases, and wherein labeling of the data is performed according to a first access to the media file by a user; (ii) preprocessing the collected data; (iii) training the machine learning FAFS model; and (iv) performing model evaluation and algorithm selection.

According to some embodiments of the present disclosure, the data may be collected from various applications, such as recording applications, e.g. Recording Pro, Media server, quality management, analytics and storage services. Furthermore, historical data may be required to train the model.

Figure 3A:
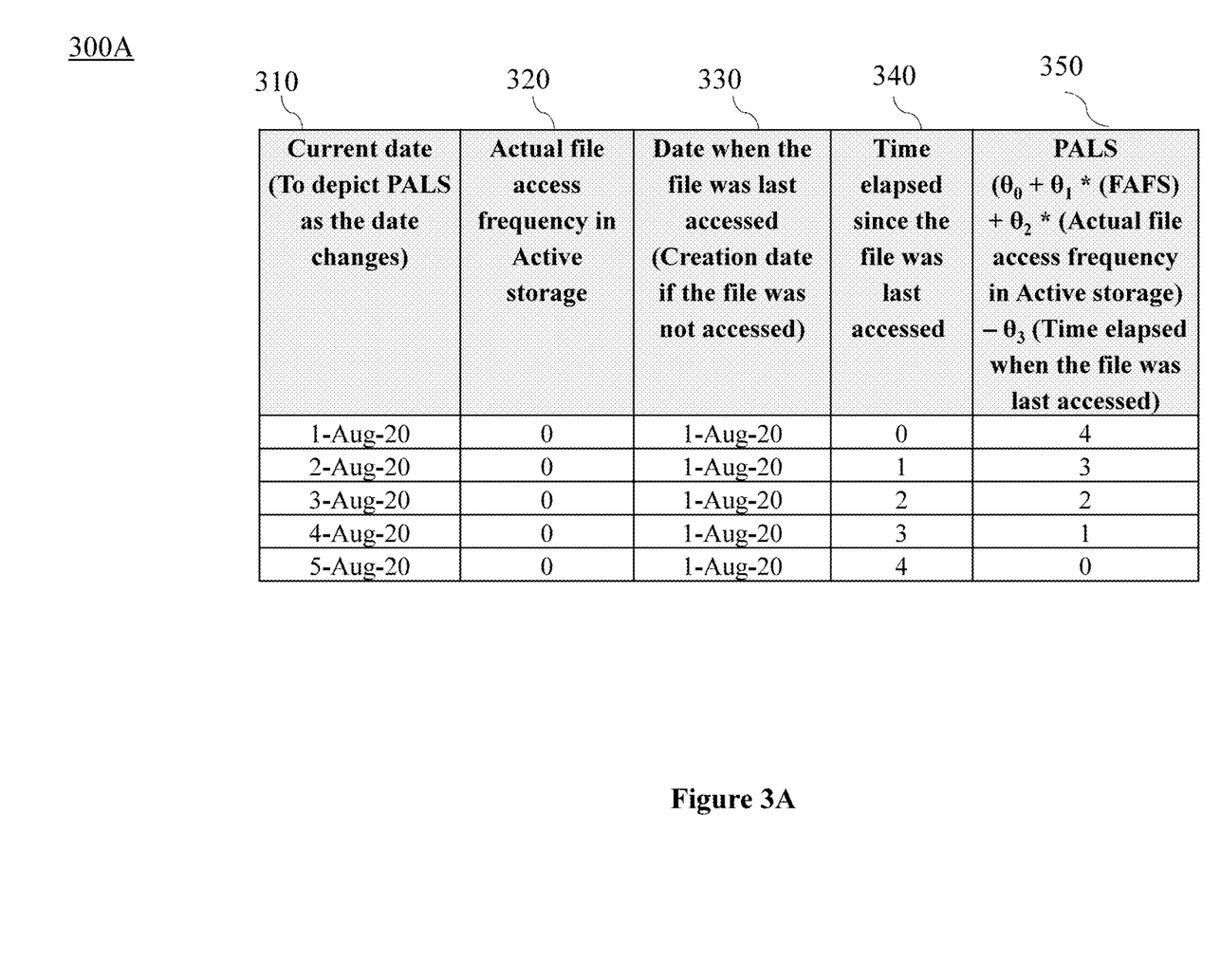
FIG. 3A shows an example of a media file with low FAFS score and was not accessed while in active storage, in accordance with some embodiments of the present disclosure.
Figure 3B:
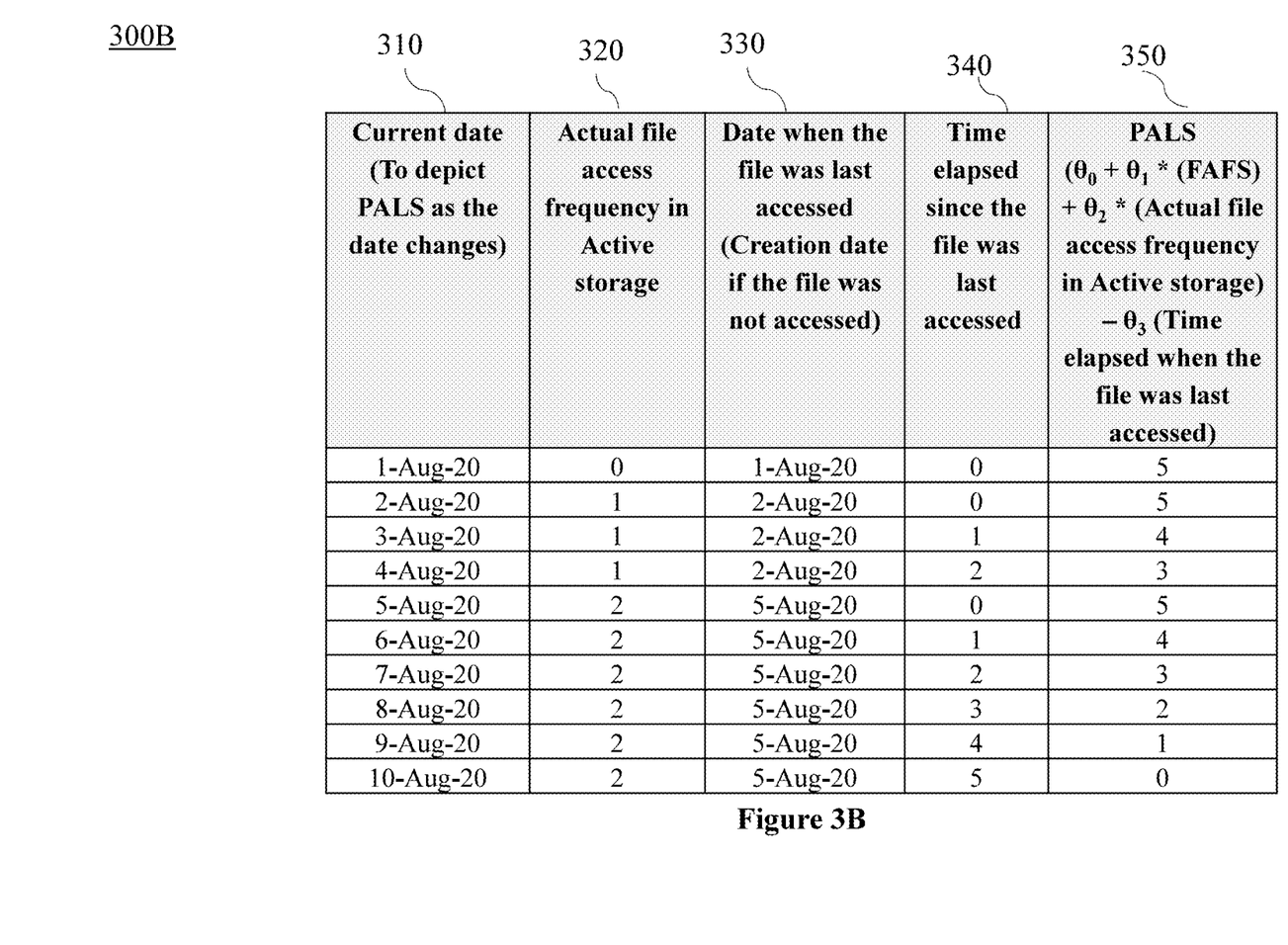
FIG. 3B shows an example of a media file with high FAFS score and was accessed while in active storage, in accordance with some embodiments of the present disclosure.

According to some embodiments of the present disclosure, the data retrieved from various applications may be labeled to use it to train the pre-built machine learning model such as FAFS 115. The data labeling may be performed based on the first access of the media file as shown in FIGS. 3A-3B. For example, if the media file is accessed by a user in the first five days, then it is assumed that the file should be in active storage 150 on arrival, otherwise the file should be moved to long-term storage, e.g., archive storage 155.

According to some embodiments of the present disclosure, as part of the data preprocessing, the following issues may be handled before building the machine learning model FAFS 115: missing data, encode categorical data, splitting data into training and test data and feature scaling. Any missing data for numerical features may be replaced by the average of the data present for that feature.

According to some embodiments of the present disclosure, encoding technique may be used for encoding the categorical data where multiple categories are present in a feature. Label encoding may be used to encode the data when only two categories, e.g., active and archive, are present, including the dependent variable. Moreover, 80% of the data may be used as training set and 20% may be used as test set. The percentage of test and training data may be varied while training the FAFS model 115.

According to some embodiments of the present disclosure, in various machine learning algorithms, feature scaling is not mandatory, but for the present machine learning model, it may aid in more effectively training. The standardization technique may be used for feature scaling. This step may be executed after the dataset may be divided into training and test sets. Feature scaling may not be applied to encoded values.

According to some embodiments of the present disclosure, once the data preprocessing phase has finished, the machine learning models may be trained with various classification algorithms. These machine learning models may be evaluated and compared. Some of the algorithms that may be implemented are logistic regression, support vector machine, kernel SVM, decision tree and random forest.

According to some embodiments of the present disclosure, model evaluation may be one of the crucial steps along with the data preparation. Accuracy of the predictions from different machine learning models may be compared using a confusion matrix. The main target may be to reduce the number of false negatives so that there is no compromise with operational efficiency. A decision threshold e.g., the FAFS threshold may be adjusted to have minimal false negatives.

According to some embodiments of the present disclosure, classification algorithms may be used but instead of predicting the storage class, the probabilities, e.g., File Access Frequency Score (FAFS) of an observation belonging to both of the storage classes may be predicted. Receiver operating characteristics (ROC) Curves and Precision-Recall Curves may be implemented to further evaluate the machine learning model and to adjust decision threshold e.g., FAFS threshold. FAFS model such as FAFS 115 may calculate an accessibility score and once calculated it may not be changed for a given media file.

According to some embodiments of the present disclosure, the PALS score may be calculated by a weighted sum of: (i) a preconfigured constant; (ii) FAFS score; (iii) a number of file access frequency in active storage; and (iv) time elapsed since the media file has been last accessed. The calculated weighted sum may be according to the following equation:

$$\text{PALS score} = \theta_0 + \theta_1*(\text{FAFS}) + \theta_2*(\text{Actual file access frequency in Active storage}) - \theta_3(\text{Time elapsed when the file was last accessed}).$$

According to some embodiments of the present disclosure, the parameters $\theta_0$ to $\theta_3$ may be preconfigured such that, a zero or negative PALS score may indicate that the file should be moved to long-term storage, i.e., archive. The parameters provide the flexibility to observe the usage pattern of the media file in production and accordingly to adjust the weights e.g., $\theta_0$ to $\theta_3$ accordingly. The weights $\theta_0$ to $\theta_3$ may be adjusted to maintain a file in active storage with no access for a preconfigured number of days.

Figure 2:
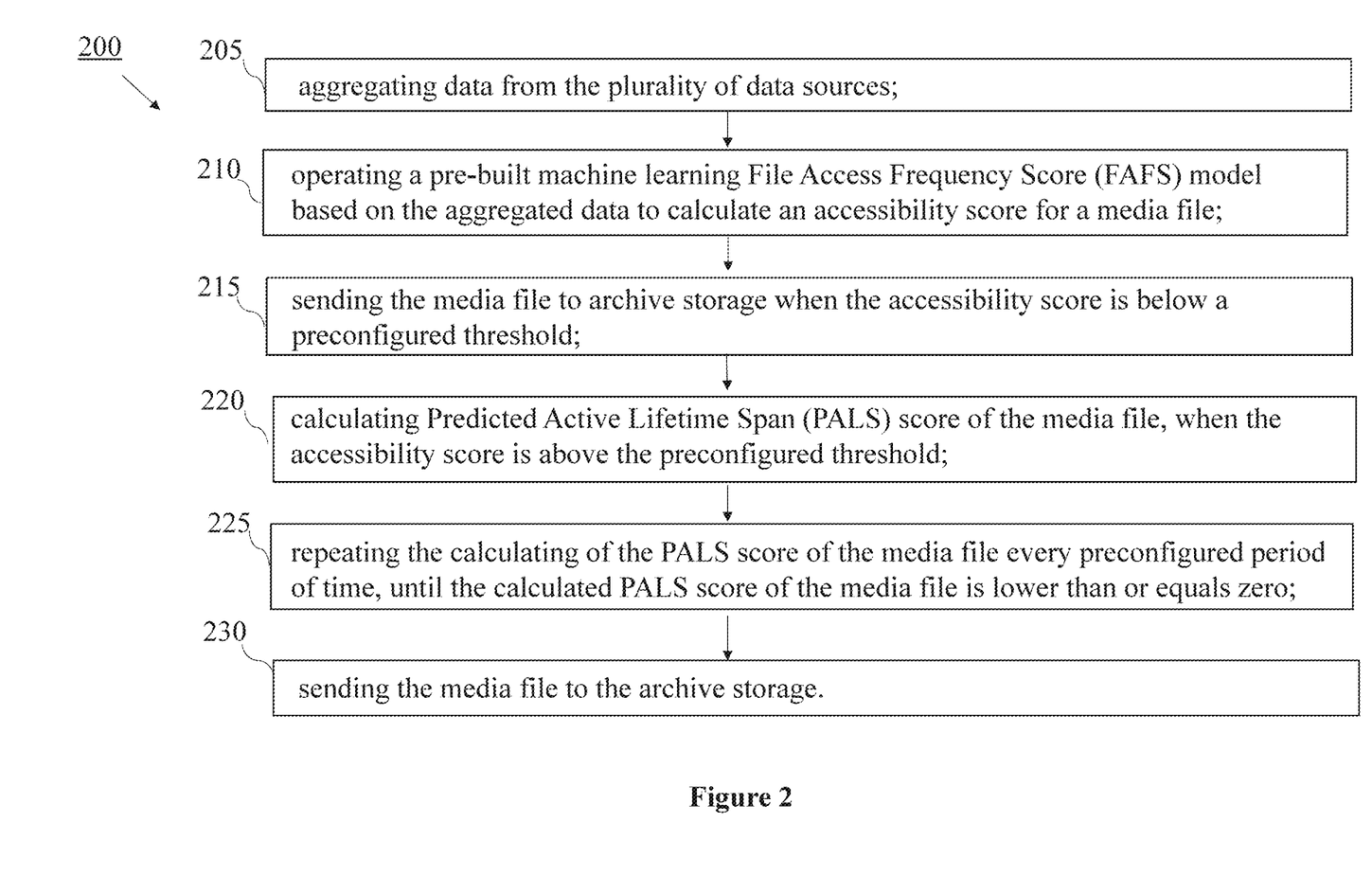
FIG. 2 is a flowchart of a computerized-method for determining a storage class of a media file, in accordance with some embodiments of the present disclosure.

FIG. 2 is a flowchart of a computerized-method for determining a storage class of a media file, in accordance with some embodiments of the present disclosure.

According to some embodiments of the present disclosure, in a computerized system comprising a processor, one or more databases of a plurality of data sources, and a memory to store the one or more databases, said processor may be configured to operate the following operations:

According to some embodiments of the present disclosure, operation 205 may comprise aggregating data from the plurality of data sources. The data sources may be recording applications, omnichannel interaction recording, email channel, chat channel, storage services, analytics application, and quality management module.

According to some embodiments of the present disclosure, operation 210 may comprise operating a pre-built machine learning File Access Frequency Score (FAFS) model based on the aggregated data to calculate an accessibility score for a media file.

According to some embodiments of the present disclosure, operation 215 may comprise sending the media file to archive storage when the accessibility score is below a preconfigured threshold.

According to some embodiments of the present disclosure, operation 220 may comprise calculating Predicted Active Lifetime Span (PALS) score of the media file, when the accessibility score is above the preconfigured threshold.

According to some embodiments of the present disclosure, operation 225 may comprise repeating the calculating of the PALS score of the media file every preconfigured period of time, until the calculated PALS score of the media file is lower than or equals zero.

According to some embodiments of the present disclosure, operation 230 may comprise sending the media file to the archive storage, FIG. 3A shows an example of a media file with low FAFS score that was not accessed while in active storage, in accordance with some embodiments of the present disclosure.

According to some embodiments of the present disclosure, a date when a media file has been created 330 may be Aug. 1, 2020.

According to some embodiments of the present disclosure, the weights in the equation to predict Predicted Active Lifetime Span (PALS) score of the media file:

$$\theta_0 + \theta_1*(\text{FAFS}) + \theta_2*(\text{Actual file access frequency in Active storage}) - \theta_3(\text{Time elapsed when the file was last accessed})$$

may be in a non-limiting example: $\theta_0=3$; $\theta_1=2$; $\theta_2=0.2$; and $\theta_3=1$, for example, when the media file is to be stored in active storage up to four days in a row with no access and then the media file may be moved to archive. [LL—can you please elaborate some more how you calculate $\theta_0-\theta_3$.

According to some embodiments of the present disclosure, $\theta_0$ is a constant which determines the minimum time a file may be stored in active storage, such as active storage 150 in FIG. 1. As to $\theta_1-\theta_3$ its configured to adjust the weight of the parameters in the equation so that a file may be stored in active storage if the file is getting accessed frequently. As to θ1, θ1 may be configured to have more weightage to FAFS, hence this number is kept a little high than other parameters. As to θ2, θ2 may be configured to be low (e.g., equals 0.2) so that accessing the files multiple times does not drastically increase the retention of the media files in active storage. As to θ3, θ3 may be configured to have moderate value (e.g., equals 1) so that every passing day the file may be moving closer to transitioning from active to archive storage.

For example, after two days have elapsed since the file have been last accessed 340, and the current date is on Aug. 3, 2020, 310, when FAFS=0.55, the PALS score 350 may be calculated according to the above-mentioned equation as follows:

$$\text{PALS score} = 3 + 2*0.55 + 0.2*0 - 1*2 = 2$$

According to some embodiments of the present disclosure, the result of the calculation may be rounded to a nearest integer.

In yet another example, after four days have elapsed since the file have been last accessed, that is on Aug. 5, 2020, and when FAFS=0.55, the PALS score 350 may be calculated as follows:

PALS score=3+2*0.55+0.2*0−1*4=0

Accordingly, after four days elapsed since the file has been last accessed, when the PALS score of the media file equals zero, the media file may be moved to long-term storage.

FIG. 3B shows an example of a media file with high FAFS score that was accessed while in active storage, in accordance with some embodiments of the present disclosure.

According to some embodiments of the present disclosure, a date when a media file has been created 330, may be Aug. 1, 2020.

According to some embodiments of the present disclosure, the weights in the equation to predict Predicted Active Lifetime Span (PALS) score of the media file:

$\theta_0 + \theta_1*(\text{FAFS}) + \theta_2*(\text{Actual file access frequency in Active storage}) - \theta_3*(\text{Time elapsed when the file was last accessed})$ may be in a non-limiting example: $\theta_0=3$; $\theta_1=2$; $\theta_2=0.2$; and $\theta_3=1$, for example, when the media file is to be stored in active storage up to five days in a row with no access and then the media file may be moved to archive.

For example, a day has elapsed since the file have been last accessed 340, and the current date is on Aug. 3, 2020, 310, when FAFS=0.85, the PALS score 350 may be calculated as follows:

PALS score=3+2*0.85+0.2*1−1*1=4

In yet another example, after four days since the file has been created and zero days have elapsed since the file have been last accessed, such as on Aug. 5, 2020, and when FAFS=0.85, the PALS score 350 may be calculated as follows:

PALS score=3+2*0.85+0.2*0−1*0=5

Accordingly, after four days, the media file may not be moved to long-term storage.

In yet another example, after four days have elapsed since the file have been last accessed, such as on Aug. 9, 2020, and when FAFS=0.85, the PALS score 350 may be calculated as follows:

PALS score=3+2*0.85+0.2*2−1*4=1

Accordingly, after four days, the media file may not be moved to long-term storage.

On Aug. 10, 2020, after five days have elapsed since the file has been last accessed the PALS score 350 may be equal to zero and the file may be moved to long-term storage. According to some embodiments of the present disclosure, the aggregated data related to an interaction may be stored as follows and it may be populated with the data coming in from various sources like recording applications, analytics applications and the like.

| ContactInformation |
| --- |
| buId: String<br>contactId: String<br>contactDate: Number |

| ContactInformation |
| --- |
| mediaType: Number<br>duration: Number<br>firstAccessed: Number<br>agents: List<String><br>customer: String<br>agentFeedback: Number<br>customerFeedback: Number<br>agentSentimentScore: Number<br>customerSentimentScore: Number<br>issueResolved: Binary<br>ivrPressPath: String<br>DNIS: String<br>campaignId: String |

According to some embodiments of the present disclosure, the aggregated data related to an agent may be stored as follows:

| AgentInformation |
| --- |
| buId: String<br>agentId: String<br>skills: List <String><br>teamId: String<br>agentQualityIndex: String |

According to some embodiments of the present disclosure, the aggregated data related to the customer may be stored as follows:

| CustomerInformation |
| --- |
| buId: String<br>customerId: String<br>customerFeedbackIndex: String<br>grade: String |

According to some embodiments of the present disclosure, the data after implementing the computerized-method for determining a storage class of a media file may be stored as follows:

| ContactScoreMetaData |
| --- |
| buId: String<br>contactId: String<br>contactDate: Number<br>fileState: Number (This field denotes whether the file is present in active or long-term strorage.)<br>mediaType: Number<br>lastAccessed: Number<br>fileAccessCount: Number<br>FAFS: Number<br>PALS: Number |

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for determining a storage class of a media file, said computerized-method comprising:
    in a computerized system comprising a processor, one or more databases of a plurality of data sources, and a memory to store the one or more databases, said processor is configured to:
        (i) aggregating data from the plurality of data sources;
        (ii) operating a pre-built machine learning File Access Frequency Score (FAFS) model based on the aggregated data to calculate an accessibility score for a media file;
        (iii) sending the media file to archive storage when the accessibility score is below or equals a preconfigured threshold;
        (iv) calculating Predicted Active Lifetime Span (PALS) score of the media file, when the accessibility score is above the preconfigured threshold and when the accessibility score is below or equals the preconfigured threshold the PALS score equals zero;
        (v) repeating the calculating of the PALS score of the media file every preconfigured period of time, until the calculated PALS score of the media the is lower than or equals zero; and
        (vi) sending the media file to the archive storage,
    wherein the media file is a recording of an interaction and wherein the aggregated data is related to the interaction and to a customer and an agent participating in the interaction.

2. The computerized-method of claim 1, wherein the storage class has related accessibility level and related cost, and wherein the storage class is selected from at least one of: archive storage and active storage.

3. The computerized-method of claim 1, wherein the pre-built machine learning FAFS model is created by:
    (i) collecting data from data sources, wherein the data is retrieved from related historical data databases, and wherein labeling of the data is performed according to a first access to the media file by a user;
    (ii) preprocessing the collected data;
    (iii) training the machine learning FAFS model; and
    (iv) performing model evaluation and algorithm selection.

4. The computerized-method of claim 1, wherein the PALS score is calculated by a weighted sum of: (i) a preconfigured constant; (ii) FAFS score; (iii) a number of file access frequency in active storage; and (iv) time elapsed since the media file has been last accessed.

5. The computerized-method of claim 4, wherein the preconfigured constant is determined according to a time period that a media file is required to be accessible.

6. The computerized-method of claim 4, wherein the weights are determined according to a time period that a media file is required to be accessible.

7. The computerized-method of claim 1, wherein the data sources are selected from at least one of: recording applications, omnichannel interaction recording, email channel, chat channel, storage services, analytics application, and quality management module.

8. The computerized-method of claim 1, wherein the aggregated data from the data sources that is related to customers is selected from at least one of: customer feedback received for the interaction, customer sentiment score on the interaction, pattern of customer feedback, and an average feedback rating provided by customers in a given interaction context.

9. The computerized-method of claim 1, wherein the aggregated data from the data sources that is related to agents is selected from at least one of:
    an agent historical performance for a skill used in the interaction, a skill used to route a contact to available agents according to customer's needs and agent feedback about the customer and a team the agent belongs to.

10. The computerized-method of claim 1, wherein the aggregated data from the data sources that is related to interactions is selected from at least one of:
    duration of the interaction as compared to Service Level Agreement (SLA), type of file, a campaign under which an interaction has been taken, and an average active storage time span of files received in similar context across customers in same domain.

* * * * *